(12) United States Patent
Kishima

(10) Patent No.: US 8,497,899 B2
(45) Date of Patent: Jul. 30, 2013

(54) BIOLOGICAL SAMPLE IMAGE ACQUIRING APPARATUS, BIOLOGICAL SAMPLE IMAGE ACQUIRING METHOD, AND PROGRAM

(75) Inventor: Koichiro Kishima, Kanagawa (JP)

(73) Assignee: Sony Corporation, Tokyo (JP)

( * ) Notice: Subject to any disclaimer, the term of this patent is extended or adjusted under 35 U.S.C. 154(b) by 550 days.

(21) Appl. No.: 12/652,128

(22) Filed: Jan. 5, 2010

(65) Prior Publication Data

US 2010/0177188 A1 Jul. 15, 2010

(30) Foreign Application Priority Data

Jan. 9, 2009 (JP) .............................. P2009-003649

(51) Int. Cl.
*H04N 7/18* (2006.01)
(52) U.S. Cl.
USPC ......................................................... 348/79
(58) Field of Classification Search
None
See application file for complete search history.

(56) References Cited

U.S. PATENT DOCUMENTS

| | | | | |
|---|---|---|---|---|
| 6,077,631 A | * | 6/2000 | Unno | 430/5 |
| 6,448,529 B1 | * | 9/2002 | Hiraishi et al. | 219/69.16 |
| 6,606,413 B1 | | 8/2003 | Zeineh | |
| 6,748,124 B1 | * | 6/2004 | Nishiyama | 382/317 |
| 2007/0121199 A1 | | 5/2007 | Suzuki | |
| 2008/0259423 A1 | * | 10/2008 | Frekers et al. | 359/199 |

FOREIGN PATENT DOCUMENTS

| | | |
|---|---|---|
| JP | 2003-222801 | 8/2003 |
| JP | 2004-132918 | 4/2004 |
| JP | 2004-294088 | 10/2004 |

OTHER PUBLICATIONS

European Search Report for corresponding EP09015441 issued on Feb. 17, 2010.
Japanese Office Action issued Aug. 28, 2012 in corresponding Japanese Patent Application No. 2009-003649.

* cited by examiner

*Primary Examiner* — Sath V Perungavoor
*Assistant Examiner* — Kate Luo
(74) *Attorney, Agent, or Firm* — K&L Gates LLP

(57) ABSTRACT

A biological sample image acquiring apparatus includes: a sample stage on which a biological sample is placed and which can move in a direction; an objective lens magnifying a region of the biological sample; an imaging device imaging the region magnified by the objective lens; a stage on which the imaging device or the objective lens is placed and which can move in a corresponding direction of the direction; a first moving mechanism moving the sample stage so that a target region of the biological sample is located at an imaging range; a second moving mechanism moving the stage in the corresponding direction at a movement speed obtained by multiplying a movement speed of the sample stage by a magnification of the objective lens; and an imaging controller starting the exposure of the imaging device before the sample stage moved by the first moving means is stopped.

8 Claims, 6 Drawing Sheets

BIOLOGICAL SAMPLE IMAGE ACQUIRING APPARATUS, BIOLOGICAL SAMPLE IMAGE ACQUIRING METHOD, AND PROGRAM

The present application claims priority to Japanese Priority Patent Application JP 2009-003649 filed in the Japan Patent Office on Jan. 9, 2009, the entire content of which is hereby incorporated by reference.

BACKGROUND

The present application relates to a biological sample image acquiring apparatus, a biological sample image acquiring method, and a program, which can be suitably used in the field of magnification and observation of a biological sample.

A biological sample such as a tissue slice is fixed to a slide glass, is stained if necessary, and is then stored. In general, when the storage period is long, the visibility of the biological sample under a microscope is reduced due to deterioration or discoloration of the tissue piece. The biological sample may be diagnosed in establishments other than the hospital in which the biological sample has been prepared. In this case, the biological sample is sent by mail, which takes a predetermined time.

In view of this situation, a device for storing a biological sample as image data has been suggested (for example, Japanese Unexamined Patent Application Publication (Translation of PCT Application) No. 2003-222801).

SUMMARY

However, when the entire image of the biological sample is acquired using such a device, it is difficult to capture the entire image of the biological sample on an imaging plane using an objective lens. Therefore, it is necessary to assign sample regions of the biological sample to an imaging range of the objective lens and to acquire images of the sample regions.

In general, to shorten the time to acquire the images of the sample regions, it is considered to increase the movement speed of a stage. However, the increase in movement speed of the stage is restricted in view of mechanical factors or prevention of vibrations. Accordingly, it is necessary to shorten the time to acquire the images of the sample regions, as well as to increase the movement speed of the stage.

It is desirable to provide a biological sample image acquiring apparatus, a biological sample image acquiring method, and a program, which can efficiently acquire images of sample regions.

According to an embodiment, there is provided a biological sample image acquiring apparatus including: a sample stage on which a biological sample is placed and which can move in a direction of the surface on which the biological sample is placed; an objective lens magnifying a region of the biological sample; an imaging device imaging the region magnified by the objective lens; a stage on which the imaging device or the objective lens is placed and which can move in a direction corresponding to the direction of the surface; first moving means for moving the sample stage so that a target region of the biological sample is located at an imaging range; second moving means for moving the stage in the corresponding direction at a movement speed obtained by multiplying a movement speed of the sample stage by a magnification of the objective lens; and imaging control means for starting the exposure of the imaging device before the sample stage moved by the first moving means is stopped.

According to another embodiment, there is provided a biological sample image acquiring method including the steps of: moving a sample stage on which a biological sample is placed in a direction of a surface on which the biological sample is placed so that a target region is located at an imaging region; moving a stage on which an objective lens or an imaging device imaging a region magnified by an objective lens is placed at a movement speed, which is obtained by multiplying the movement speed of the sample stage by a magnification of the objective lens, in a corresponding direction of the direction; and starting the exposure of the imaging device before the sample stage moved in the step of moving the sample stage is stopped.

According to another embodiment, there is provided a program for performing the steps of: causing a sample stage on which a biological sample is placed to move in a direction of a surface on which the biological sample is placed so that a target region is located at an imaging region; causing a stage, on which an objective lens or an imaging device imaging a region magnified by an objective lens is placed, to move at a movement speed which is obtained by multiplying a movement speed of the sample stage by a magnification of the objective lens in a corresponding direction of the direction; and causing the imaging device to start the exposure before the sample stage moved in the step of moving the sample stage is stopped.

According to the above-mentioned configuration, by causing the imaging device or the objective lens to follow the sample stage, it is possible to avoid the wobbling of the sample region even when the exposure start time of the imaging device is set before the stop time of the sample stage. By setting the exposure start time of the imaging device before the stop time of the sample stage, it is possible to shorten the time from the stage start-up time to the imaging end time. Accordingly, it is possible to implement a biological sample image acquiring apparatus, a biological sample image acquiring method, and a program which can efficiently acquire an image of a sample region Additional features and advantages are described herein, and will be apparent from the following Detailed Description and the figures.

DETAILED DESCRIPTION

Figure 1:
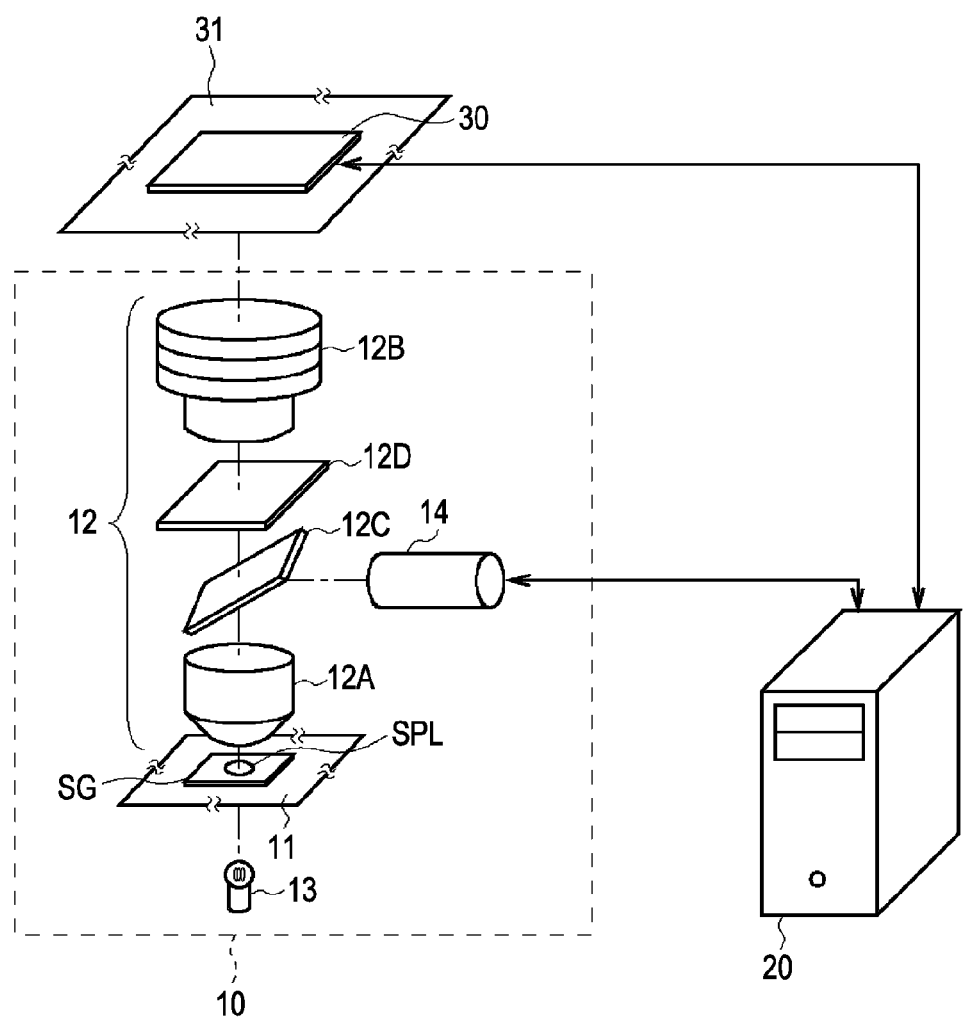
FIG. 1 is a diagram schematically illustrating the configuration of a biological sample image acquiring apparatus.

The present application will be described below with reference to the drawing according to an embodiment.

1. Embodiment
1-1. Configuration of Biological Sample Image Acquiring Apparatus
1-2. Configuration of Data Processor
1-3. Countermeasure of Shortening of Generation Time of Biological Sample Image
1-4. Flow of Sample Image Acquiring Process 1-5. Advantages
2. Other Embodiments

1. Embodiment

1-1. Configuration of Biological Sample Image Acquiring Apparatus

FIG. 1 shows a biological sample image acquiring apparatus 1 according to an embodiment of the invention. The biological sample image acquiring apparatus 1 includes a microscope 10 and a data processor 20.

The microscope 10 includes a stage (hereinafter, referred to as "sample stage") 11 having a surface on which a biological sample SPL such as a tissue slice or biological polymers of cells or chromosomes is placed and moving in directions (xyz axis directions) parallel or perpendicular to the surface.

In this embodiment, the biological sample SPL is fixed to a slide glass SG by a predetermined fixing technique and is stained if necessary. Examples of the staining technique include fluorescent staining such as a FISH (Fluorescence In-Situ Hybridization) technique and an enzyme antibody technique, in addition to general staining techniques such as hematoxylin-eosin (HE) staining, Giemsa staining, Papanicolaou staining.

An optical system 12 is disposed on one side of the sample stage 11 of the microscope 10 and a lighting lamp 13 is disposed on the other side of the sample stage 11. The light from the lighting lamp 13 arrives as illumination light for the biological sample SPL disposed on one surface of the sample stage 11 from an opening formed in the sample stage 11.

The microscope 10 magnifies a partial image of the biological sample SPL acquired by the illumination light at a predetermined magnification by the use of a first objective lens 12A and a second objective lens 12B of the optical system 12. The microscope 10 focuses the image magnified by the objective lenses 12A and 12B onto an imaging plane of an imaging device 30.

On the other hand, an exciting light source 14 applying exciting light for fluorescent stain is disposed at a predetermined position of the microscope 10. In this embodiment, a light emitting diode is employed as the exciting light source 14 in view of a decrease in size, an increase in lifetime, and an increase in brightness, and a power save.

When the exciting light is applied from the exciting light source 14, the microscope 10 reflects the exciting light by the use of a dichroic mirror 12C disposed between the first objective lens 12A and the second objective lens 12B and guides the reflected exciting light to the first objective lens 12A. Then, the microscope 10 concentrates the exciting light to a slide glass SG disposed on the sample stage 11 by the use of the first objective lens 12A.

When the biological sample SPL fixed to the slide glass SG has been subjected to the fluorescent staining, fluorescent pigments emit light by the exciting light. Light (hereinafter, referred to as "colored light") acquired by the emission of light passes through the dichroic mirror 12C via the first objective lens 12A. The colored light arrives at the second objective lens 12B via a light-absorbing filter plate 12D disposed between the dichroic mirror 12C and the second objective lens 12B.

The microscope 10 magnifies the image acquired by the colored light by the use of the first objective lens 12A and absorbs light (hereinafter, referred to as "external light") other than the colored light by the use of the light-absorbing filter plate 12D. Then, the microscope 10 magnifies an image acquired by the colored light from which the external light is removed by the use of the second objective lens 12B and focuses the magnified image onto the imaging plane of the imaging device 30.

Figure 2A:
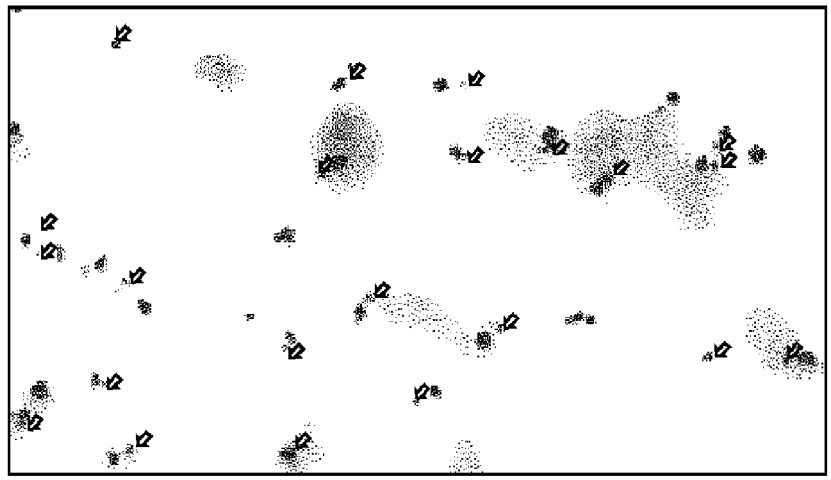
FIGS. 2A and 2B are photographs of a fluorescent image.
Figure 2B:
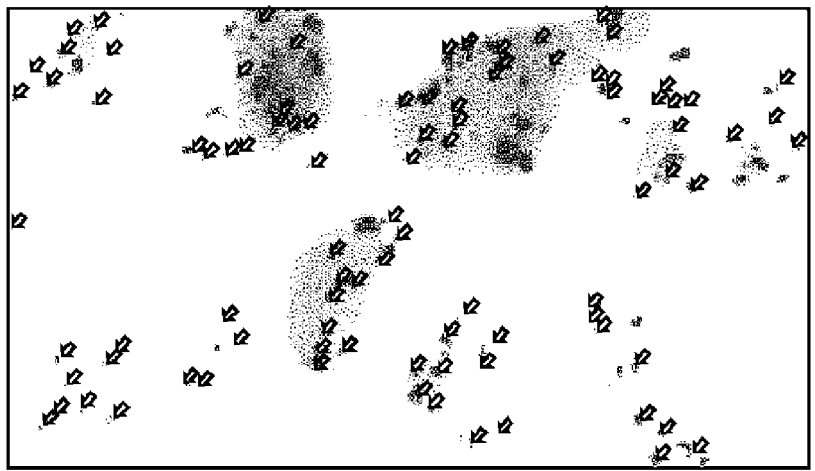

Here, a photograph of a fluorescent image of the biological sample SPL imaged by the microscope 10 is shown as an example in FIGS. 2A and 2B. FIGS. 2A and 2B are acquired by hybridizing HER2 (Human Epithelial growth factor Receptor type 2) protein in a mammary gland tissue and a probe (Pathvysion of HER-2 DNA probe kit made by Abbott Laboratories) using the FISH technique. The mammary gland tissue shown in FIG. 2A is collected from a normal person and the mammary gland tissue shown in FIG. 2B is packed from a breast cancer patient.

As shown in FIGS. 2A and 2B, in a virulent mammary gland tissue, fluorescent pigments (portions indicated by arrows) of labeled substance increase more than those in a normal mammary gland tissue. As can be clearly seen from FIGS. 2A and 2B, since the HER2 protein multiplies in vicious tumors such as breast cancer, ovarian cancer, uterine cancer, stomach cancer, vesical cancer, small-cell lung cancer, and prostate cancer, cells generated as indicators indicating degrees of growth of the vicious tumors can be made to be visible.

On the other hand, the data processor 20 generates an entire image of the biological sample SPL (hereinafter, also referred to as "biological sample image") using the imaging device 30 and stores the generated image as a predetermined format of data (hereinafter, also referred to as "sample data").

The biological sample image acquiring apparatus 1 can store the biological sample SPL on the slide glass SG as a microscopically-examined image. Accordingly, the biological sample image acquiring apparatus 1 can store the biological sample SPL for a long period of time without deteriorating the fixed state or the stained state, compared with the case where the slide glass SG itself is stored.

1-2. Configuration of Data Processor

Figure 3:
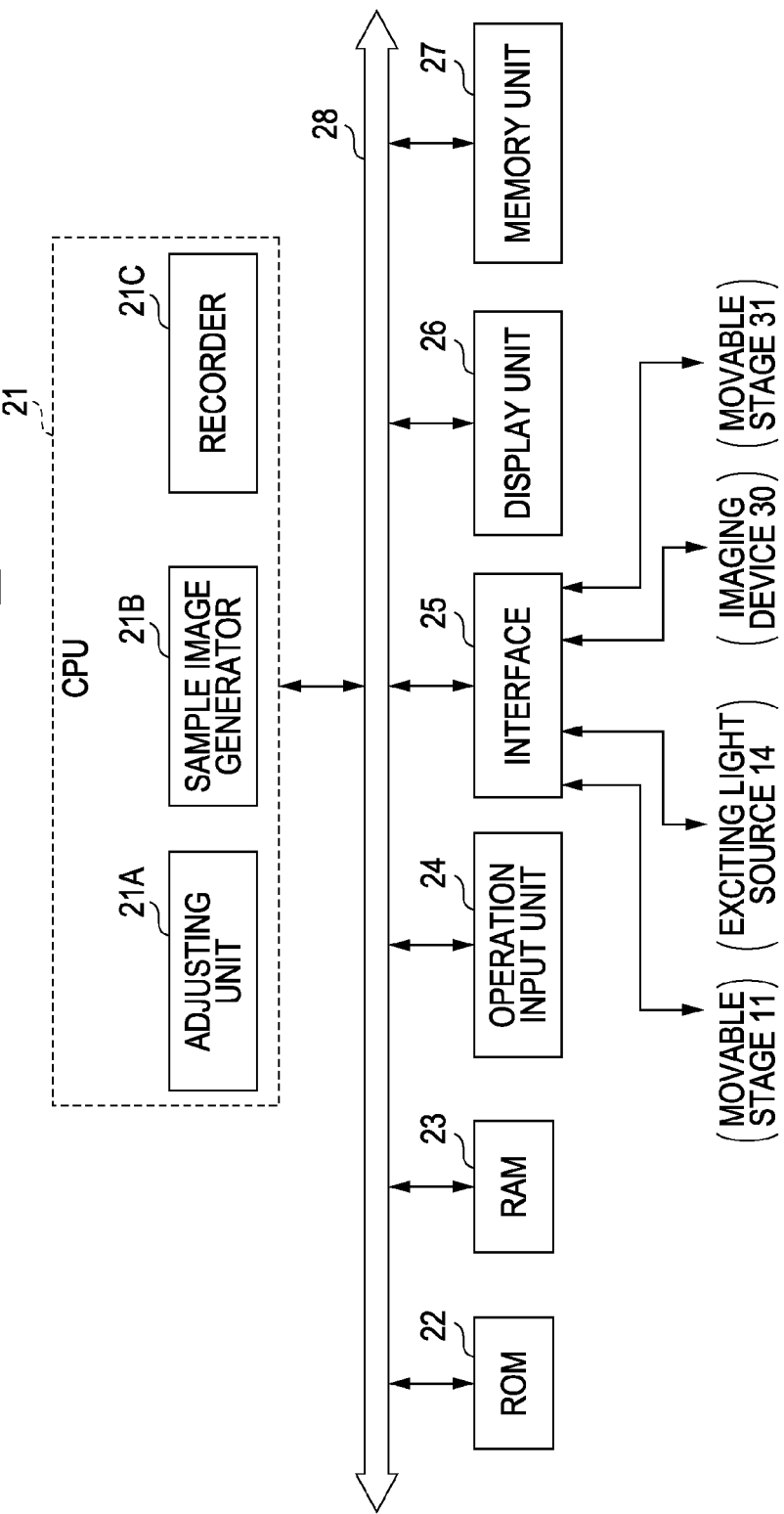
FIG. 3 is a block diagram illustrating the configuration of a data processor.

The configuration of the data processor 20 will be described below. As shown in FIG. 3, the data processor 20 is constructed by connecting various hardware elements to a CPU (Central Processing Unit) 21 taking charge of control.

Specifically, a ROM (Read Only Memory) 22, a RAM (Random Access Memory) 23 serving as a work memory of the CPU 21, an operation input unit 24 inputting a command corresponding to a user's operation, an interface 25, a display unit 26, and a memory unit 27 are connected to the CPU via a bus 28.

Programs for executing various processes are stored in the ROM 22. The sample stage 11, the exciting light source 14, and the imaging device 30 (see FIG. 1) are connected to the interface 25. The imaging device 30 is disposed on a stage (hereinafter, also referred to as "imaging device stage") 31 (see FIG. 1) which can move in directions parallel and perpendicular to the optical axis of the optical system 12 and the imaging device stage 31 is also connected to the interface 25.

A liquid crystal display, an EL (Electro Luminescence) display, or a plasma display is used as the display unit 25. a magnetic disk such as an HD (Hard Disk), a semiconductor memory, or an optical disk is used as the memory unit 26.

The CPU 21 develops a program corresponding to the command input from the operation input unit 23 in the RAM 23 out of plural programs stored in the ROM 22 and properly controls the display unit 25 and the memory unit 26 on the basis of the developed program. The CPU 21 properly controls the sample stage 11, the imaging device stage 31, the exciting light source 14, and the imaging device 30 via the interface 25.

In this embodiment, when a command to acquire the entire image of the biological sample SPL as data is given from the operation input unit 23, the CPU 21 develops the program (hereinafter, also referred to as "sample image acquiring program") corresponding to the command in the RAM 23. In this case, the process of the CPU 21 can be functionally divided into a pre-processing unit 21A, a sample image generator 21B, and a recorder 21C.

The pre-processing unit 21A performs a process of adjusting a focal position of the optical system 12 and a process of adjusting the sensitivity of the imaging device 30 as a pre-process.

Specifically, the pre-processing unit 21A acquires imaged data as the photoelectric conversion result in the imaging device 30, when the focal position of the optical system 12 is adjusted. The pre-processing unit 21A changes the relative position of the optical system 12 and the imaging device 30 in the optical axis direction (z direction) of the imaging plane of the imaging device 30 by the use of the stage 11 or 31 on the basis of the pixel values of the imaged data.

The pre-processing unit 21A acquires the imaged data from the imaging device 30, when the sensitivity of the imaging device 30 is adjusted. The pre-processing unit 21A changes all or a part of the applied light quantity (light intensity) of the exciting light of the exciting light source 14, the exposing time of the imaging device 30, and the aperture size of an iris diaphragm (not shown) on the basis of the pixel values indicated by the imaged data.

The sample image generator 21B moves the sample stage 11 in the in-plane direction when various adjustments of the pre-processing unit 21A are ended.

Figure 4:
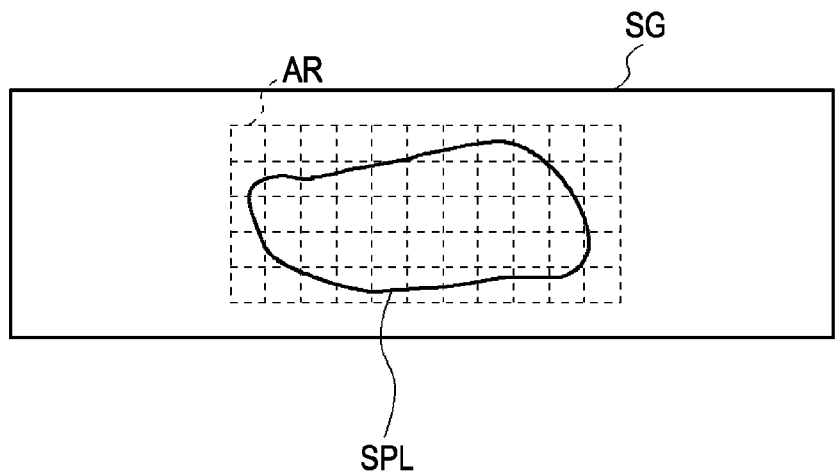
FIG. 4 is a schematic diagram used to explain a process of acquiring an image of each region of a biological sample.

Specifically, the sample stage 11 is sequentially moved so that a target region (hereinafter, referred to as "sample region") of the biological sample SPL is located in an imaging range, and the biological sample SPL is assigned to the imaging ranges AR, for example, as shown in FIG. 4. In FIG. 4, regions of the biological sample SPL to be assigned to the imaging ranges AR do not overlap with each other, but a part of neighboring regions may overlap with each other.

The sample image generator 21B generates the biological sample image by causing the imaging device 30 to image the region whenever the target sample region is moved to the imaging range AR and connecting the images of the sample regions acquired as the result.

When the biological sample image is generated, the recorder 21C generates sample data including pixel information indicating the entire biological sample image or a part capable of reproducing the biological sample image.

The recorder 21C adds data indicating identification information of the biological sample image to the sample data and records the sample data to which the data is added in the memory unit 27.

The identification information includes information such as the collector name, the collector sex, the collector age, and the collection date of the biological sample SPL. The recorder 21C notifies that the identification information should be input at a predetermined time such as a time when a data storing command of the biological sample SPL is given or a time when the slide glass SG should be set.

When the identification information is not acquired at the time of generating the biological sample data, the recorder 21C gives an alarm about the input of the identification information. That is, the notification or alarm for inputting the identification information is carried out by the use of, for example, a sound or a GUI (Graphical User Interface) picture.

1-3. Countermeasure of Shortening of Generation Time of Biological Sample Image In the sample image generator 21B of this embodiment, a countermeasure of shortening the time for generating a biological sample image is considered.

As described above, the sample image generator 21B sequentially moves the sample stage 11 so that the target region of the biological sample SPL is located at the imaging range AR of the objective lens 12B when the biological sample SPL is imaged by regions.

Figure 5:
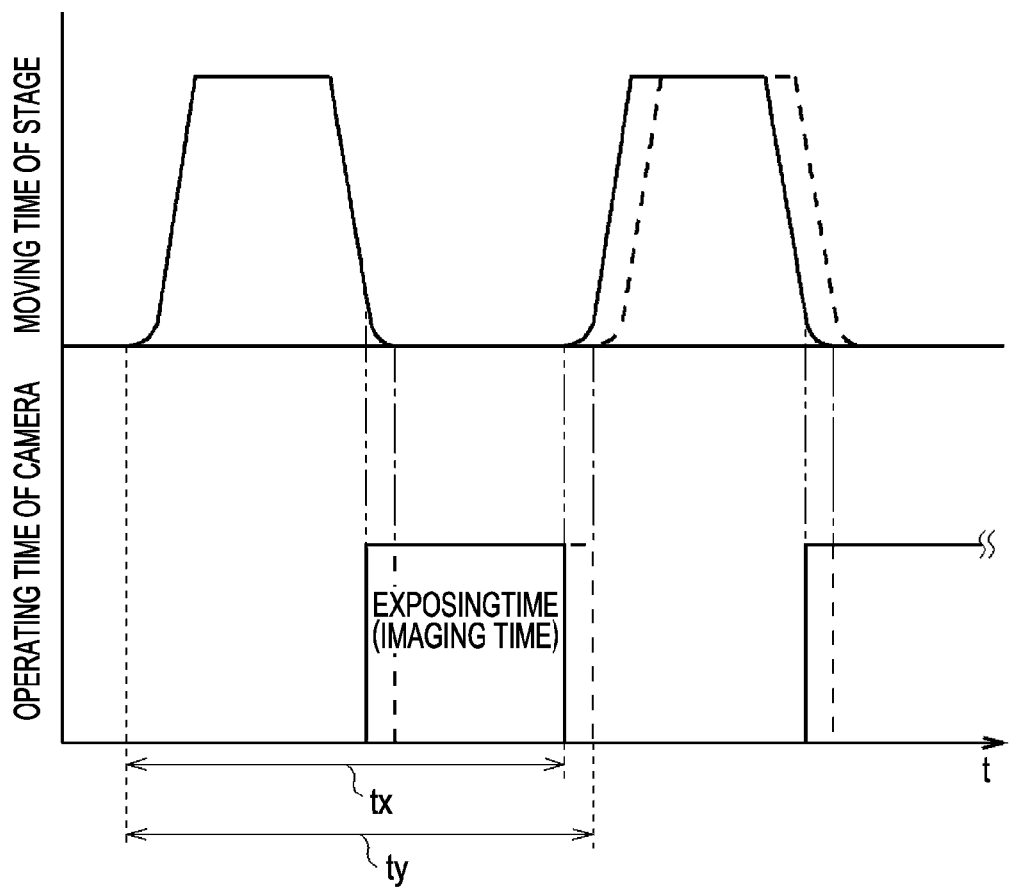
FIG. 5 is a schematic diagram used to explain a process (1) of shortening the time to generate a biological sample image.

In this case, as shown in FIG. 5, the sample image generator 21B causes the imaging device 30 to start the exposure (start the imaging) before the stop time of the sample stage 11 moved until the target sample region is located at the imaging range AR.

Therefore, the moving time of the sample stage 11 necessary before imaging the target region partially overlap with the exposure time of the imaging device 30. Accordingly, the total time tx of the moving time and the exposure time is shorter than the total time ty in the case where the exposure start time of the imaging device 30 is after the complete stop time of the sample stage 11.

As a result, the sample image generator 21B can shorten the generation time until the images of the regions of the biological sample SPL are connected to generate the biological sample image.

The sample image generator 21B causes the imaging device 30 to follow the biological sample SPL by moving the imaging device stage 31 having the imaging device 30 disposed thereon in the moving direction of the sample stage 11 at a movement speed reflecting the total magnification of the objective lenses 12A and 12B.

Specifically, the sample image generator 21B acquires position data from the driving motor of the sample stage 11 every predetermined sampling period, and calculates the movement speed and the moving direction of the sample stage on the basis of the position data. The sample image generator 21B multiplies the movement speed of the sample stage 11 by the magnifications of the objective lenses 12A and 12B.

The sample image generator 21B generates control data for moving the imaging device stage in the direction corresponding to the moving direction of the sample stage 11 at the movement speed acquired as the multiplication result, and sends the control data to the driving motor of the imaging device stage 31.

Accordingly, since the relative position of the sample stage 11 and the imaging device stage 31 is equal to or substantially equal to the positional relation in the case where the stages 11 and 31 are stopped, the wobbling of the image due to the exposure start of the imaging device 30 before the stop time of the sample stage 11 does not occur.

In this way, the sample image generator 21B moves the imaging device stage 31 at the movement speed reflecting the magnification of the objective lens 12 in the direction corresponding to the moving direction of the sample stage 11 and causes the imaging device 30 to start the exposure before the sample stage 11 is stopped. Accordingly, the sample image generator 21B can shorten the generation time of the biological sample image while suppressing the deterioration (wobbling) of the image.

1-4. Flow of Sample Image Acquiring Process

A flow of a sample image acquiring process of the CPU 21 having developed a sample image acquiring program in the RAM 23 will be described now. Here, in the above description on the recorder 21C, the notification or alarm of the input of the identification information is not described for the purpose of convenient explanation.

That is, the CPU 21 starts the sample image acquiring process and performs the process of steps SP1, when a command to acquire the entire image of the biological sample SPL as data is input from the operation input unit 23.

In step SP1, the CPU 21 performs as a pre-process the process of adjusting the focal position of the optical system 12 and the process of adjusting the sensitivity of the imaging device 30 and then performs the process of step SP2.

In step SP2, the CPU 21 starts the movement of the sample stage 11 so that the target sample region of the biological sample SPL is located at the imaging region AR, and then performs the process of step SP3.

In step SP3, the CPU 21 moves the imaging device stage 31 at the movement speed, which is obtained by multiplying the movement speed of the sample stage 11 by the magnification of the objective lens 12 (12A and 12B), in the direction corresponding to the moving direction of the sample stage 11.

In step SP4, the CPU 21 causes the imaging device 30 to start the exposure from the deceleration start time of the sample stage 11 to the stop time on the basis of the maximum movement speed of the sample stage 11, and then performs the process of step SP5.

In step SP5, the CPU 21 determines whether all the regions of the biological sample SPL are imaged. Here, when it is determined that all the regions are not imaged, the CPU 21 performs the process of step SP2 again when the exposure started in step SP4 is ended.

On the contrary, when it is determined that all the regions are imaged, the CPU 21 connects the images of the regions of the biological sample SPL to generate the biological sample image in step SP6.

In step SP7, the CPU 21 generates the biological sample image as sample data, records the sample data in the memory unit 27 with data, which indicates the identification information, added thereto, and then ends the sample image acquiring process.

In this way, the CPU 21 performs the sample image acquiring process in accordance with the sample image acquiring program.

1-5. Advantages

According to the above-mentioned configuration, the biological sample image acquiring apparatus 1 causes the imaging device stage 31 to follow the sample stage 11, when the target sample region is located at the imaging range by the movement of the sample stage 11.

Then, the biological sample image acquiring apparatus 1 causes the imaging device 30 to start the exposure before the sample stage 11 in which the target sample region has been located at the imaging range is completely stopped (see FIG. 5).

Even when the exposure start time of the imaging device 30 is set before the stop time of the sample stage 11, the biological sample image acquiring apparatus 1 can avoid the wobbling of the sample region by causing the imaging device stage 31 to follow the sample stage 11.

The biological sample image acquiring apparatus 1 can shorten the time from stage start-up time to the imaging end time for one sample region by setting the exposure start time of the imaging device 30 before the stop time of the sample stage 11.

Therefore, the biological sample image acquiring apparatus 1 can assign the biological sample SPL to the imaging range of the objective lens 12B and can greatly shorten the time until the image of the assigned sample region is acquired.

The speed in the period (rising period) from the movement start time of the sample stage 11 to just after the start time and the period (falling period) from just before the stop and the stop time is slow due to the mechanical structure or factors for prevention of vibrations (see FIG. 5). In other words, the ratio of the rising period or the falling period to the entire moving time from the movement start time to the stop time is higher than that of the periods except the rising period or the falling period.

Therefore, in view of the shortening of the time from the stage start-up time to the imaging end time, it is particularly useful that the exposure start time of the imaging device 30 can be set before the stop time of the sample stage 11. Without any particular control of keeping the deceleration constant, it is useful in view of the shortening the time from the stage start-up time to the imaging end time.

When a full size of 36 (mm)×24 (mm) is used as the imaging plane size of the imaging device, the number of images (the number of imaging times) of regions to be imaged in the entire biological sample SPL is smaller than that when an imaging plane size smaller than the full size is used.

Therefore, when the size of 36 (mm)×24 (mm) or more is used as the imaging plane size of the imaging device 30 in this embodiment, it is possible to further shorten the generation time of the biological sample image.

According to the above-mentioned configuration, it is possible to implement the biological sample image acquiring apparatus 1 which can shorten the generation time of the biological sample image while suppressing the image deterioration (wobbling) and can thus efficiently acquire the images of the sample regions.

2. Other Embodiments

Figure 6:
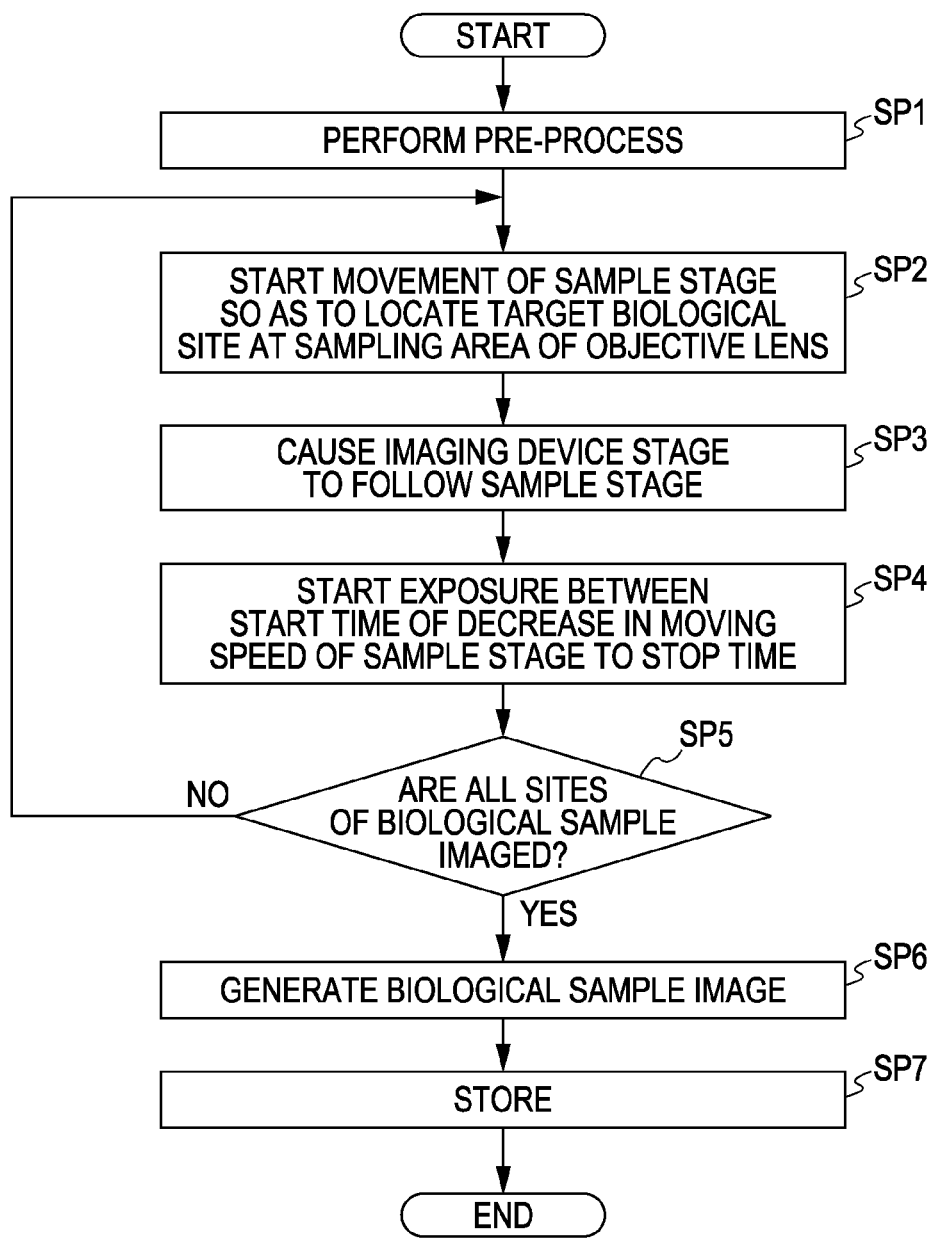
FIG. 6 is a flowchart illustrating a flow of a sample image acquiring process.

In the above-mentioned embodiment, the movement of the sample stage 11 is started so that the next target sample region is located at the imaging range after the imaging (exposure) of the present target sample region is ended (see the description of step SP5 (NO) in FIG. 6).

The movement start time of the sample stage 11 may be set before the imaging (exposure) of the present target region is ended. That is, as described with reference to FIG. 6, the CPU 21 does not perform the process of step SP2 again at the end time of the exposure started in step SP4, but can perform the process of step SP2 again before the end time.

Figure 7:
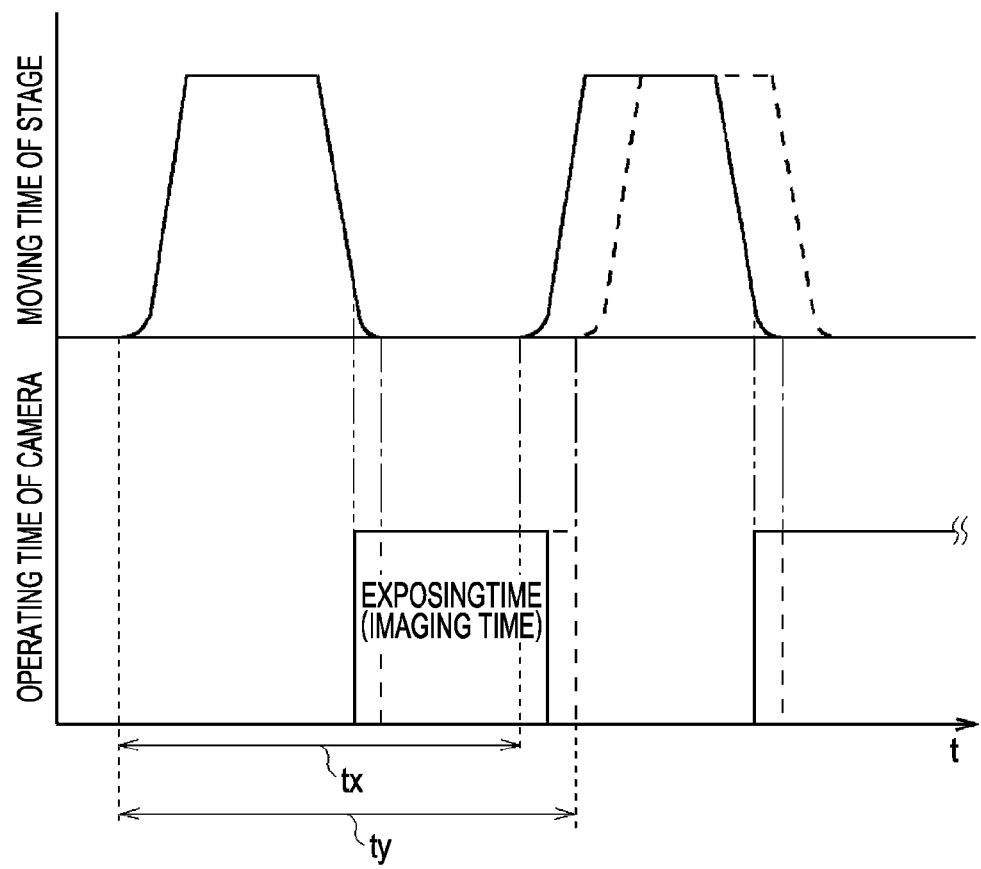
FIG. 7 is a schematic diagram used to explain a process (2) of shortening the time to generate a biological sample image.

In this case, as can be clearly seen from FIG. 7, the overlap period of the moving time of the sample stage 11 until the target region is imaged and the exposing time of the imaging device 30 is shorter than that of the above-mentioned embodiment (FIG. 5). Accordingly, the CPU 21 can further shorten the generation time of the biological sample image in comparison with the above-mentioned embodiment (FIG. 5) while suppressing the image deterioration (wobbling).

In the above-mentioned embodiment, the exposure start time of the imaging device 30 is prior to the stop time of the sample stage 11. What time it is prior by is not particularly limited, as long as it is prior to the stop time of the sample stage 11 so that the target sample region is in the imaging range.

It is preferable that it is between the deceleration start time of the sample stage 11 to the stop time thereof with respect to the maximum movement speed of the sample stage 11. It is more preferable that it is before the deceleration is slowed after the sample stage 11 is decelerated constantly with respect to the maximum movement speed of the sample stage 11.

In the above-mentioned embodiment, the images of the regions to be imaged are connected after all the regions of the biological sample SPL are imaged. However, the connection is not limited to the embodiment. For example, the image may be connected whenever an image is taken in the unit of one region or a predetermined number of regions.

In the above-mentioned embodiment, two objective lenses 12A and 12B are used. However, the number of objective lenses may be one. The objective lenses 12A and 12B may be configured to change the magnification using a revolver or the like. The objective lens 12B may be replaced with an ocular.

When the objective lens 12B is replaced with an ocular, it is necessary to change the position of the imaging device stage 31 so as to observe the sample using the ocular. For example, a beam splitter is disposed in the optical path of the optical system 12 and the ocular is disposed in the optical axis of one-side light split by the beam splitter. In addition, the imaging device stage 31 which is movable in the directions parallel and perpendicular to the optical axis of the other-side light is disposed and then the imaging device 30 is disposed on the imaging device stage 31. In this case, the above-mentioned advantages of the embodiment can be obtained even when the sample is observed using the ocular.

In any case, there does not exist such a restriction that the sample stage 11 and the imaging device stage 31 should be disposed parallel to each other.

In the above-mentioned embodiment, when a desired region of the biological sample SPL is moved to the imaging range, the imaging device stage 31 is caused to follow the sample stage 11. However, the objective lens 12 (12A and 12B) instead of the imaging device stage 31 may be caused to follow the sample stage. In this case, the same advantages as the above-mentioned embodiment can be obtained.

In the above-mentioned embodiment, when the sample stage 11 is followed, the mobility (the movement speed and the moving direction) is calculated by the calculation based on the position data acquired from the driving motor every predetermined sampling period. However, the method of acquiring the mobility is not limited to the embodiment. For example, the mobility may be acquired from the variation in voltage or current acquired from an acceleration sensor.

In the above-mentioned embodiment, the sample data acquired in the sample image acquiring process is stored in the memory unit 27 of the data processor 20 via the bus 28. The memory unit 27 is not limited to the installation inside the data processor 20, but may be installed outside the data processor 20. The communication medium of the sample data with the memory unit 27 is not limited to the bus 28, but wired or wireless communication mediums such as a local area network, the Internet, and a digital satellite broadcast may be employed.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A biological sample image acquiring apparatus comprising:
   a sample stage on which a biological sample is placed and which can move in a direction of the surface on which the biological sample is placed;
   an objective lens magnifying a region of the biological sample;
   an imaging device imaging the region magnified by the objective lens;
   a stage on which the imaging device or the objective lens is placed and which can move in a corresponding direction of the direction of the surface;
   first moving means for moving the sample stage so that a target region of the biological sample is located at an imaging range;
   second moving means for moving the stage in the same direction as the sample stage at a movement speed obtained by multiplying a movement speed of the sample stage by a magnification of the objective lens; and
   imaging control means for starting the exposure of the imaging device after a deceleration start time of same and before the sample stage moved by the first moving means and the stage moved by the second moving means are stopped.

2. The biological sample image acquiring apparatus according to claim 1, wherein the first moving means starts the movement of the sample stage so that a next target region is located at the imaging range before the exposure started by the imaging control means is ended.

3. The biological sample image acquiring apparatus according to claim 1, wherein the second moving means moves the stage in the same direction as the sample stage so as to reduce wobble of the sample at the target region.

4. The biological sample image acquiring apparatus according to claim 1, wherein the second moving means stops movement of the stage at substantially the same time when the first moving means stops the sample stage.

5. The biological sample image acquiring apparatus according to claim 1, wherein the objective lens is moved, instead of the stage, in the same direction as the sample stage.

6. A biological sample image acquiring method comprising:
   moving a sample stage on which a biological sample is placed in a direction of a surface on which the biological sample is placed so that a target region is located at an imaging region;
   moving a stage on which an objective lens or an imaging device imaging a region magnified by an objective lens is placed at a movement speed, which is obtained by multiplying a movement speed of the sample stage by a magnification of the objective lens, in a same direction as the sample stage; and
   starting the exposure of the imaging device after a deceleration start time of same and before the sample stage and the stage are stopped.

7. A program stored on a non-transitory computer-readable medium configured to perform the steps of:
   causing a sample stage on which a biological sample is placed to move in a direction of a surface on which the biological sample is placed so that a target region is located at an imaging region;
   causing a stage, on which an objective lens or an imaging device imaging a region magnified by an objective lens is placed, to move at a movement speed which is obtained by multiplying a movement speed of the sample stage by a magnification of the objective lens in a same direction as the sample stage; and causing the imaging device to start the exposure after a deceleration start time of same and before the sample stage and the stage are stopped.

8. A biological sample image acquiring apparatus comprising:
- a sample stage on which a biological sample is placed and which can move in a direction of the surface on which the biological sample is placed;
- an objective lens magnifying a region of the biological sample;
- an imaging device imaging the region magnified by the objective lens;
- a stage on which the imaging device or the objective lens is placed and which can move in a corresponding direction of the direction;
- a first moving mechanism moving the sample stage so that a target region of the biological sample is located at an imaging range;
- a second moving mechanism moving the stage in the same direction as the sample stage at a movement speed obtained by multiplying a movement speed of the sample stage by a magnification of the objective lens; and
- an imaging controller starting the exposure of the imaging device after a deceleration start time of same and before the sample stage and the stage are stopped.

* * * * *